United States Patent
Leibholz et al.

(10) Patent No.: US 6,954,846 B2
(45) Date of Patent: Oct. 11, 2005

(54) MICROPROCESSOR AND METHOD FOR GIVING EACH THREAD EXCLUSIVE ACCESS TO ONE REGISTER FILE IN A MULTI-THREADING MODE AND FOR GIVING AN ACTIVE THREAD ACCESS TO MULTIPLE REGISTER FILES IN A SINGLE THREAD MODE

(75) Inventors: Daniel Leibholz, Newton, MA (US); Wayne Yamamoto, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 580 days.

(21) Appl. No.: 09/924,335

(22) Filed: Aug. 7, 2001

(65) Prior Publication Data

US 2003/0033509 A1 Feb. 13, 2003

(51) Int. Cl.$^7$ .............................................. G06F 12/14
(52) U.S. Cl. ...................... 712/43; 712/229; 712/228; 712/217; 711/163
(58) Field of Search ............................. 712/228, 216, 712/43, 229, 217; 711/163

(56) References Cited

U.S. PATENT DOCUMENTS

| | | | | |
|---|---|---|---|---|
| 5,301,340 A | * | 4/1994 | Cook | 712/24 |
| 5,900,025 A | * | 5/1999 | Sollars | 712/248 |
| 5,913,059 A | * | 6/1999 | Torii | 718/104 |
| 6,026,479 A | * | 2/2000 | Fisher et al. | 712/24 |
| 6,092,175 A | * | 7/2000 | Levy et al. | 712/23 |
| 6,651,158 B2 | * | 11/2003 | Burns et al. | 712/205 |
| 6,718,457 B2 | * | 4/2004 | Tremblay et al. | 712/212 |

OTHER PUBLICATIONS

Halfhill, T., "Already there. . . Alpha 21264 stakes off the claim—long before Merced", *Der Spiegel* (Oct. 12, 1997), retrieved from: http://www.heise.de/ct/english/98/15/192/.
Lo, Jack L. et al., "Software–Directed Register Deallocation for Simultaneous Multithreaded Processors", University of Washington Technical Report#UW–CSE–Dec. 1, 1997.
Meyer, D., "The AMD–K7™ Processor", presentation slides from Microprocessor Forum (1998).
Scherer, A. et al., "An Out–of–Order Three–Way Superscalar Multimedia Floating–Point Unit", 1999 IEEE International Solid–State Circuits Conference (1999).
EE Times Staff, "Battle Lines Drawn For Next–Generation MPUs", *TechWeb* (Oct. 19, 1998), retrieved from: http://content.techweb.com/wire/story/TWB19981019S0006.

* cited by examiner

*Primary Examiner*—William M. Treat
(74) *Attorney, Agent, or Firm*—Lahive & Cockfield, LLP (57) ABSTRACT

A microprocessor includes multiple register files. In a single thread mode, the microprocessor allows a single thread to have access to multiple ones of the register files. In a multi-thread mode, each thread has access to respective ones of the register files. In the multi-thread mode, multiple threads are simultaneously executing. Circuitry and hardware are provided to facilitate the respective modes and to facilitate transitions between the modes.

19 Claims, 7 Drawing Sheets

MICROPROCESSOR AND METHOD FOR GIVING EACH THREAD EXCLUSIVE ACCESS TO ONE REGISTER FILE IN A MULTI-THREADING MODE AND FOR GIVING AN ACTIVE THREAD ACCESS TO MULTIPLE REGISTER FILES IN A SINGLE THREAD MODE

The present invention relates generally to microprocessors and more particularly to the architectural reuse of registers for out of order simultaneous multi-threading.

BACKGROUND OF THE INVENTION

Out of order simultaneous multi-threading refers to a technique in which multiple threads are executing at the same time on a processor that is capable of speculative execution. Speculative execution refers to instances wherein instructions in a program are issued out of order according to their data dependencies but not necessarily according to their sequential appearance in the program. Thus, with speculative execution instructions may be executed "out of order."

Instructions are typically executed with references to registers. The registers may hold operands for the instructions and may store results of operations. Out of order execution of instructions requires not only the preservation of conventional register states but also the preservation of register state for speculatively executed instructions. For example, if an instruction beyond a predicted branch in an instruction flow is issued out of order, the microprocessor must write the results of speculatively executing the instruction. However, if the branch was predicted incorrectly, the previous results stored in the register must be restored and the speculative results must be removed. Hence, simultaneous multi-threading that employs out of order execution requires the preservation of register state not only for general purpose registers for all threads but also for a speculative issue of instructions as well. As a result, simultaneous multithreading demands a large register file. A "register file" is an array of registers that may be addressed as a unit.

Conventional simultaneous multi-threading microprocessors employ of one of two approaches. In a first approach, a single register file may be shared amongst multiple threads. With this first approach, resource contention among threads for the register file may arise, and the use of the register file by one of the threads may detrimentally affect the use of the register file by another one of the threads. In a second approach, two "private" register files are provided. The second approach does not have resource contention problems, but when only one thread is active, half of the registers in the register files are unused.

SUMMARY OF THE INVENTION

The present invention addresses some of the limitations found with conventional microprocessors by providing a microprocessor that is capable of executing in either a multi-thread mode or a single thread mode. In the multi-thread mode, each active thread may have an associated register file which the thread may access. In the single thread mode, a single thread is active and the thread has access to all of the available register files. In one embodiment of the present invention, two threads may simultaneously execute and there are two register files. In the single thread mode, the single active thread may have access to both of the register files.

In accordance with one aspect of the present invention, A microprocessor includes a first register file and a second register file that each contain registers. The microprocessor also includes a facility for granting access to the first and second register files in a single thread mode and in a multi-thread mode. In the single thread mode, a single thread has access to both the first register file and the second register file. In the multi-thread mode, a first thread has access to the first register file and a second thread has access to the second register file. The microprocessor may provide support for switching between the single thread mode and the multi-thread mode.

In accordance with another aspect of the present invention, a method is practiced in a microprocessor that has multiple register sets. Respective threads are provided which are simultaneously executing in a multi-thread mode with access to separate respective ones of the register sets. A switch is made from the multi-thread mode to a single thread mode. In the single thread mode, a single thread is executing and has access to all of the register sets.

In accordance with a further aspect of the present invention, a microprocessor includes a first bank of execution units for executing instructions and a second bank of execution units for executing instructions. The multiple execution units help to maximize the issue rate of instructions. The microprocessor further includes a first register file having read and write ports associated with a first bank of execution units as well as read and write ports associated with a second bank of execution units. The microprocessor includes a second register file that has read and write ports associated with the first bank of execution units as well as read and write ports associated with a second bank of execution units. The microprocessor has circuitry for enabling or disabling selected ones of the write ports to control access by threads to the register files.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention provides a microprocessor that is capable of simultaneously executing multiple threads or, instead, executing a single thread. In the multi-thread mode of operation, multiple threads simultaneously execute and each thread has an associated register file and a bank of execution units. The microprocessor also may operate in a single thread mode wherein only the single thread executes. In this mode of operation, the microprocessor takes measures to optimize performance of the single thread. These measures include providing the single thread with access to multiple execution units provided in the microprocessor. These measures help to maximize performance of the microprocessor. The microprocessor seeks to maximize the issue rate of instructions per cycle.

Figure 1:
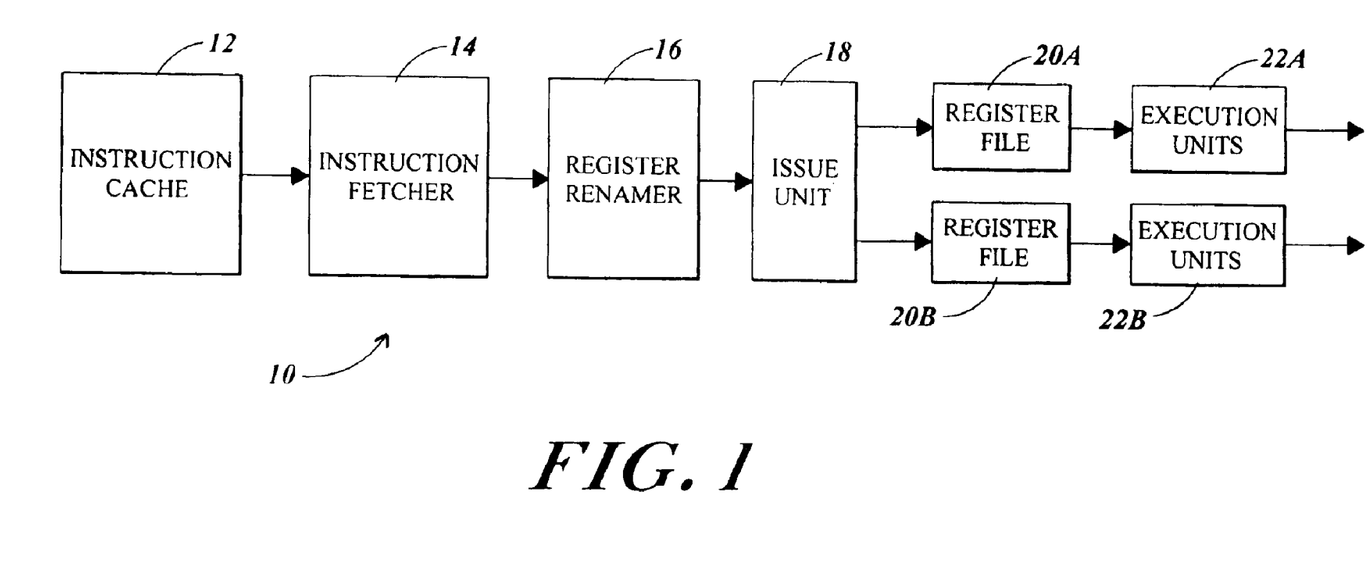
FIG. 1 is a block diagram of a microprocessor suitable for practicing the illustrative embodiment of the present invention.

FIG. 1 depicts a block diagram of a microprocessor 10 that is suitable for practicing the illustrative embodiment of the present invention. The depiction of the microprocessor in FIG. 1 is intentionally simplified so as to not obfuscate the invention. Moreover, those skilled in the art will appreciate that the depiction of the microprocessor architecture in FIG. 1 is intended to be merely illustrative and not limiting of the present invention. The present invention may be practiced with alternative microprocessor configurations.

The microprocessor 10 includes an instruction cache 12 for caching instructions that are slated for execution. In the illustrative embodiment, the instruction cache 12 is capable of providing up to eight instructions per clock cycle. The instruction cache should be of suitable size, such as 64 kilobytes, and may be an associative cache. The instruction fetcher 14 fetches bundles of instructions from the instruction cache 12 and passes the bundles onto the register renamer 16. In the illustrative embodiment, it is presumed that the instruction fetcher 14 fetches bundles containing eight instructions. Nevertheless, those skilled in the art will appreciate that in alternative embodiments different numbers of instructions may be fetched.

The register renamer 16 decodes instructions, determines instruction dependencies and performs logical mappings of register specifiers. In particular, instructions typically specify operands by giving logical register specifications. Results of operations performed by instructions may also be specified by logical register specifications. For example, the instruction "add R1, R2 and R3" requests that the values stored in logical register R1 and R2 be added and the results stored in logical register R3. These logical register specifications (e.g. R1, R2 and R3) are mapped to physical registers in a register file. The instructions with renamed registers are then issued by an issue unit 18 into one of two pipelines. The first pipeline includes a register file 20A and a bank of execution units 22A. The second pipeline contains a register file 20B and a bank of execution units 22B. Each of the banks of execution units 22A and 22B may include multiple arithmetic and logical units (e.g. 3 units). The issue unit 18 determines when to issue instructions to the respective pipelines. Each register file 20A and 20B is a holder of an array of registers that may be tied to respective execution units 22A and 22B. The execution units 22A and 22B are responsible for executing instructions that have been issued into the instruction pipelines. As part of executing instructions, the execution units 22A and 22B may reference the register files 20A and 20B to obtain operands and store results.

As mentioned above, in the illustrative embodiment, the microprocessor 10 may operate in the single thread mode or the multi-thread mode. In the single thread mode, a single register name is renamed to refer to two locations in register files 20A and 20B (i.e., one location in register file 20A and one location in register file 20B). In contrast, in the multi-thread mode, a register name refers to a single location. In the single thread mode, both of the register files 20A and 20B may be accessible by a single thread. This optimizes performance of the single thread and allows a more maximized peak issue rate. In contrast, with the multi-thread mode, each thread has access to only a single one of the register files 20A and 20B.

Figure 2A:
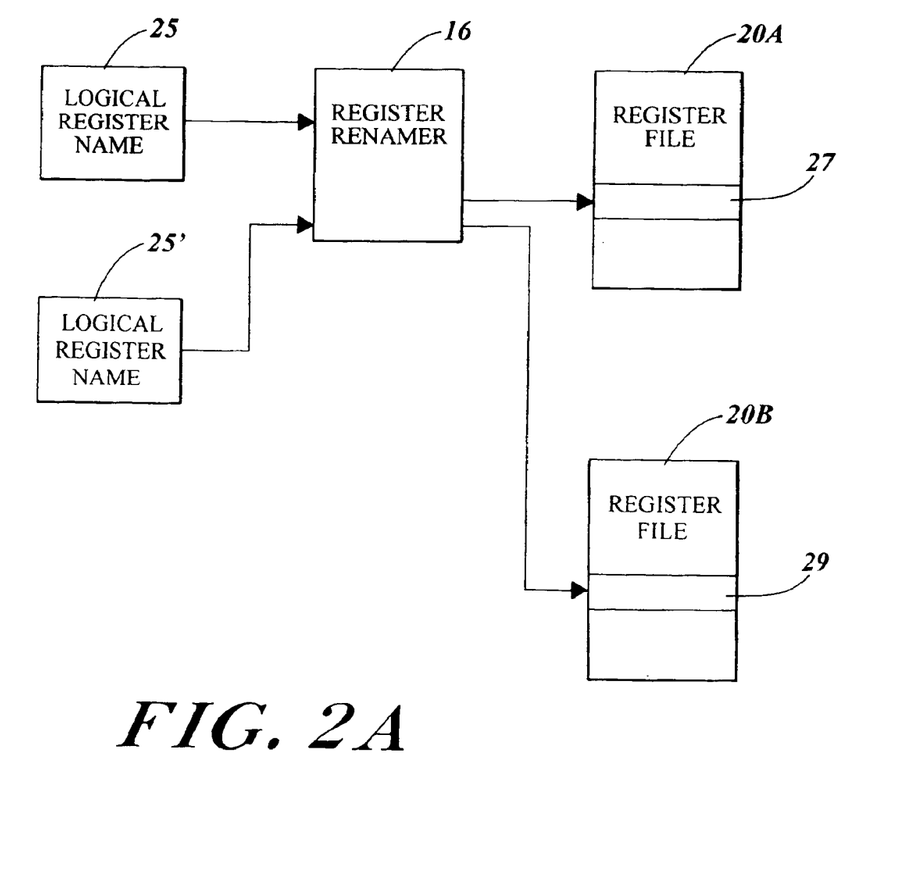
FIG. 2A illustrates a mapping of logical register names to physical registers in the multi-thread mode of operation.
Figure 2B:
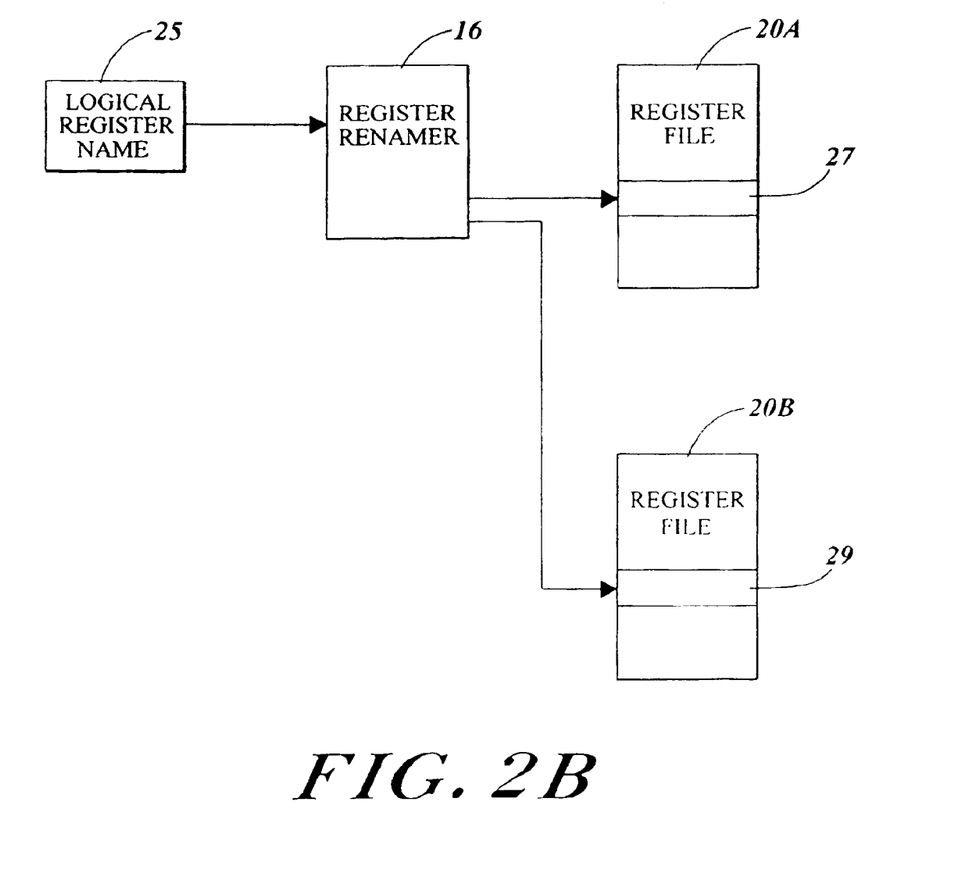
FIG. 2B illustrates a mapping of a logical register names to physical registers in single thread mode of operation.

FIG. 2A illustrates an example of the mapping of a logical register name to a physical register name in multi-thread mode. A first thread has an instruction with an operand that is specified by a logical register name 25. The register renamer 16 maps the logical register name to a physical register 27 in register file 20A. A second thread has an instruction with an operand that is specified by a logical register name 25'. The renamer 16 maps the logical register name 25' to another register 29 in register file 20B. In contrast, in single thread mode, the logical register name 25 (See FIG. 2B) is mapped to two physical registers 27 and 29 in the respective register files 20A and 20B. The registers 20A and 20B hold identical contents.

Figure 3:
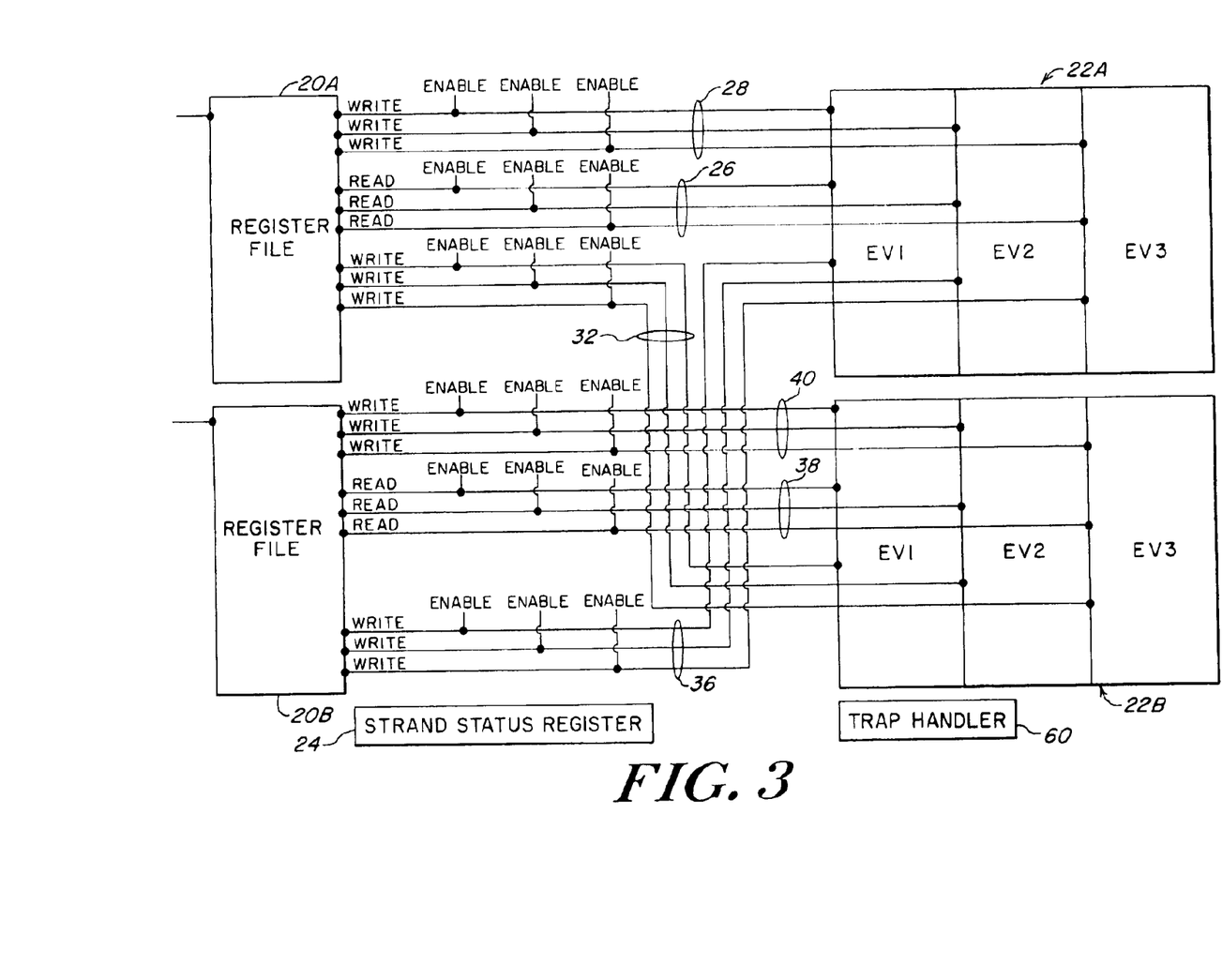
FIG. 3 is a block diagram illustrating interconnectivity between register files and execution units as well as a strand status register and a trap handler.

FIG. 3 depicts a block diagram of the components that facilitate the register files 20A and 20B being shared and not shared in the respective modes. Register file 20A has read ports 26 and write ports 28 for execution unit 22A. The read ports 26 allow the execution unit 22A to read the contents of registers stored within the register file 20A. The write ports 28, on the other hand, enable the execution unit 22A to write data into the registers of the register file 20A. There are also write ports 32 for execution unit 22B.

Register file 20B is similarly cross-connected with both of the execution units 22A and 22B. Write ports 36 are provided for execution unit 22A. Read ports 38 and write ports 40 are provided for execution unit 22B. The ports may be enabled or disabled by the respective enables. The enables are controlled by the thread state, as reflected by the strand status register 24 (discussed below).

FIG. 3 also shows a strand status register 24. The strand status register 24 holds information regarding each strand. There is a bit within the status register for each strand that identifies whether the strand is active or not. A "strand" should be differentiated from a "thread." A "thread" refers to a unit of execution such as an executing program. A "strand" refers to the hardware resources that are dedicated for a thread during execution. Hence, each thread has an associated strand.

Figure 4:
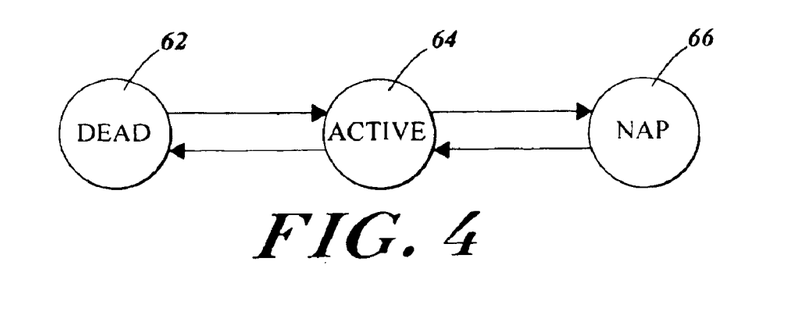
FIG. 4 is a state diagram illustrating states for a strand.

FIG. 4 depicts the three states 62, 64 and 66 that may be assumed by a strand. In the active state, the strand has instructions that are being fetched and scheduled for execution. In the dead state 62, there are no resources dedicated to the strand. In the nap state 66, new instructions for the strand are no longer fetched but instructions for the strand continue to execute if they have already been fetched.

FIG. 3 also depicts a trap handler 60. The trap handler 60 is a piece of software that is responsive to a trap. Traps are utilized to activate and deactivate threads in the illustrative embodiment of the present invention. Hence, transitions from single thread mode to multi-thread mode and vice versa may be realized via traps that are processed by the trap handler 60.

Those skilled in the art will appreciate the depiction of the register files and execution units and that FIG. 3 is intended to be merely illustrative and not limiting of the present invention. The present invention may also include embodiments where there are more than two register files. Moreover, the connection of the read and write ports shown in FIG. 3 may vary so as to facilitate the different modes.

Still further, there may be more than one strand status register 24 and more than one trap handler 60.

Figure 5:
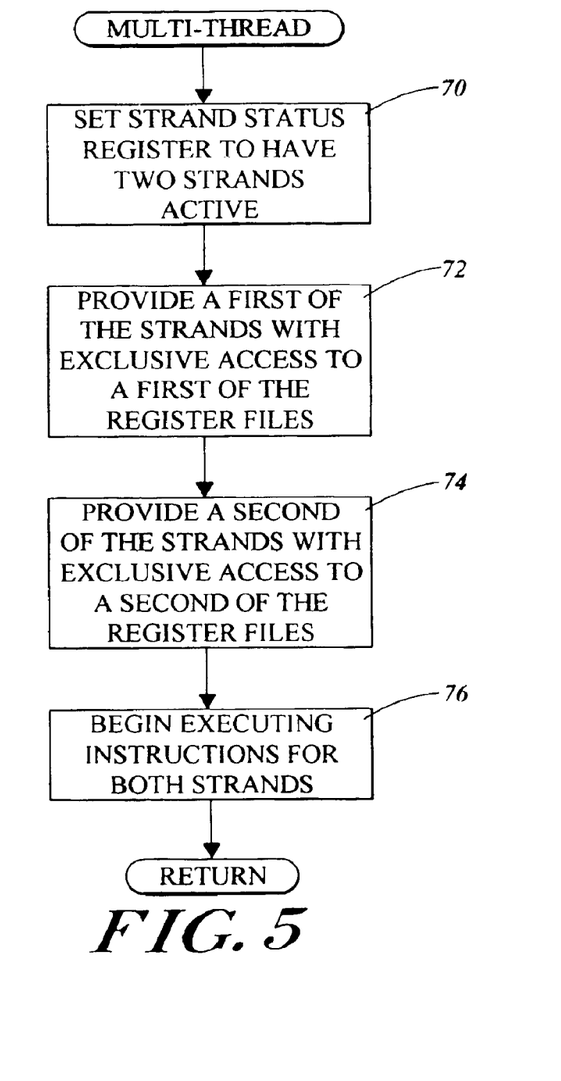
FIG. 5 is a flow chart illustrating the steps that are performed for the multithread mode of operation.

FIG. 5 is a flow chart illustrating the steps that are performed to realize the register file allocation that is provided in the multi-thread mode. Initially, the strand status register 24 is set to have two strands active (step 70 in FIG. 5). The values within the strand status register may be set by privileged instructions. Privileged instructions may only be issued by privileged processes or threads. Non-privileged processes or thread may not issue such privileged instructions. As mentioned above, a trap may be performed to spawn a new thread. This trap is handled by the trap handler 60 that writes appropriate values into the strand status register 24.

In the multi-thread mode, a first of the active strands is provided with exclusive access to a first of the register files (step 72 in FIG. 5). For example, a first strand may be provided with exclusive access to register file 20A. This strand includes execution unit 22A. The execution unit 22A has read ports 26 and write ports 28 enabled by the respective enables. The enables may simply be switches tied to logically high or low values. In contrast, the write ports 32 for execution unit 22B (which is associated with another strand) are disabled. Conversely, read ports 38 and write ports 40 for execution unit 22B are enabled so that a second strand has exclusive access to the register file 20B. Write ports 36 are disabled. The enables are set in response to the values within the strand status register 24. Hence, the second of the strands is provided with exclusive access to the second of the register files (step 74 in FIG. 5). The instructions then may begin executing on both strands (step 76 in FIG. 5).

Figure 6:
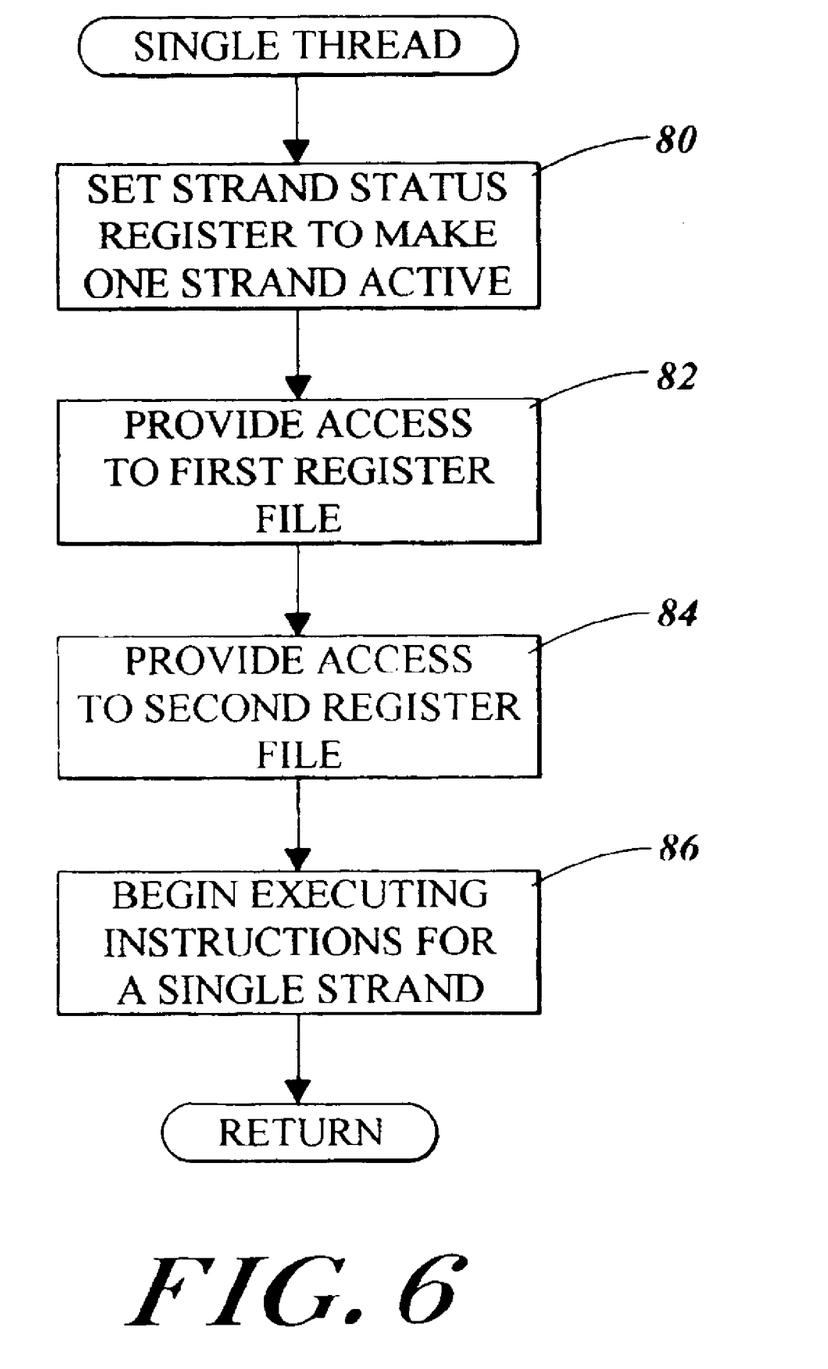
FIG. 6 is a flow chart illustrating the steps that are performed for the single thread mode of operation.

The microprocessor 10 may also run in a single thread mode. FIG. 6 is a flow chart illustrating the steps that are performed to enable the register files 20A and 20B to be accessible by a single thread in the illustrative embodiment. In the case where the single thread has access to both register files 20A and 20B, both register files hold the same contents. The process of initiating the single thread mode initiates with the strand status register 24 being configured to make a single strand active with all others being inactive (i.e. napping or dead) (step 80 in FIG. 6). For illustrative purposes, suppose that the strand is associated with execution unit 22A. Hence, in order to gain access to the register file 20A, read ports 26 and write ports 28 are enabled (step 82 in FIG. 6). The strand is also provided access to the second register file (step 84 in FIG. 6). Accordingly, read ports 34 and write ports 36 are enabled for execution unit 22A. The strand then may begin executing instructions (step 86 in FIG. 6).

Figure 7:
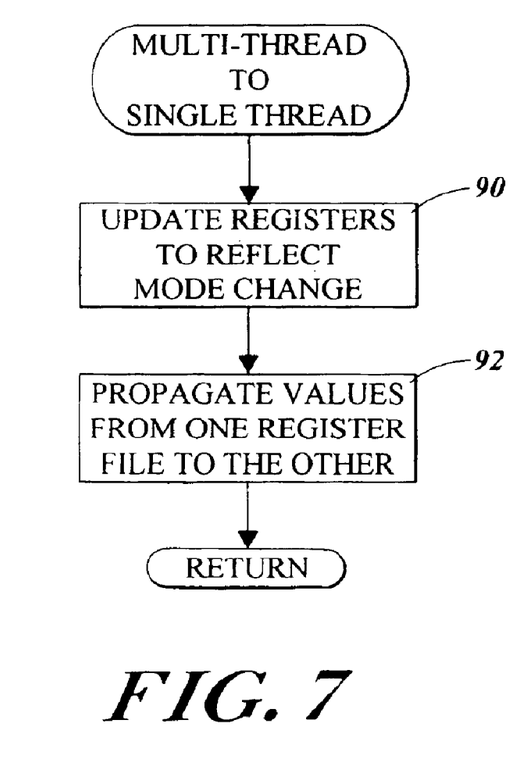
FIG. 7 is a flow chart illustrating the steps that are performed to make a transition from the multi-thread mode of operation to the single thread mode of operation.

The microprocessor 10 must be able to transition from the single thread mode to the multi-thread mode and from the multi-thread mode to the single thread mode. There is a complication in transition from the multi-thread mode to the single thread mode. The complication is that the contents register files 20A and 20B must be reconciled so as to have the same contents. FIG. 6 illustrates the steps that are performed in making the transitions from multi-thread mode to single thread mode. Initially, the strand status register must be updated to reflect the mode change (step 90 in FIG. 7). The values from one of the register files must be propagated to the other register file (step 92 in FIG. 7). In the illustrative embodiment, this propagation of values is performed in software. This software may be part of the trap handler 60 that is responsive to a trap that causes the transition from multi-thread mode to single thread mode. Each of the register files 20A and 20B includes a respective load port 61 and 63 for enabling register values to be loaded en masse to the register files.

Figure 8:
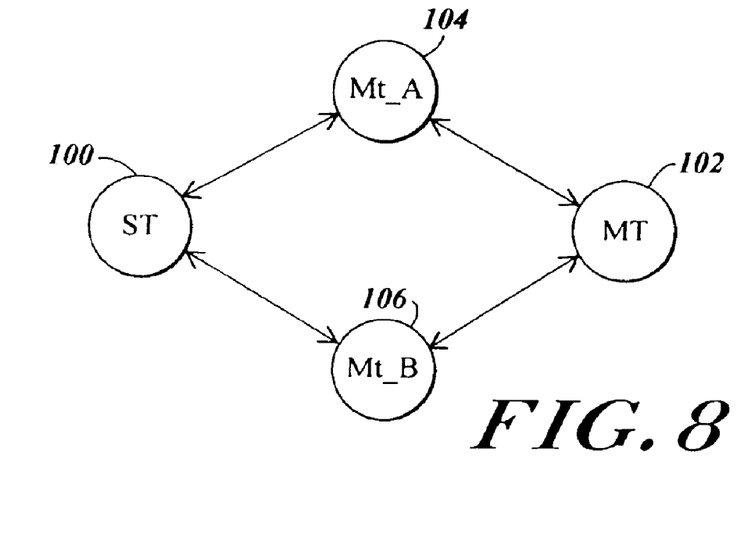
FIG. 8 depicts a state siagram illustrating the states for transitioning between the single thread mode of operation and the multi-thread mode of operation.

FIG. 8 depicts a state diagram illustrating the transition from single-thread (ST) mode 100 to multi-thread (MT) mode 102. During transition, one of the hybrid states 104 or 106 is entered to do reconciling between the register files. The register files are designated as A and B. For example, in transitioning from multi-thread mode 102 to single-thread mode 100 where the strand using register file A is to enter the single-thread mode, state 104 is entered to copy the contents of the register file A into register file B. Analogously, state 106 is entered when the strand using register file B is to operate in single-thread mode 100 so that the contents of register file B can be copied into register file A. Conversely, in making the transition from single-thread mode 100 to multi-thread mode 102 the appropriate contents may be loaded or get copied in register file A or register file B in respective states 104 and 106 to support the multiple-threads.

While the present invention has been described with reference to an illustrative embodiment thereof, those skilled in the art will appreciate that various changes in form and detail may be made without departing from the intended scope of the present invention as defined in the appended claims.

What is claimed is:

1. A microprocessor, comprising:
   a first register file containing registers;
   a second register file containing registers; and
   a facility for granting access to the first and second register files in a single thread mode and in a multi-thread mode, wherein, in the single thread mode, a register name is renamed to refer to a first location in the first register file and to a first location in the second register file and a single thread has access to both the first register file and the second register file and wherein, in the multi-thread mode, the register name refers to one location in one of the first register file and the second register file where a first thread has exclusive access to the first register file and a second thread has exclusive access to the second register file.

2. The microprocessor of claim 1, wherein, in the single thread mode, the single thread has exclusive access to both the first register file and the second register file, relative to other threads.

3. The microprocessor of claim 1, wherein the facility includes a mechanism for switching between the single thread mode and the multi-thread mode.

4. The microprocessor of claim 3, wherein the mechanism includes control registers that control whether the microprocessor executes in the single thread mode or in the multi-thread mode.

5. The microprocessor of claim 4, wherein the mechanism includes software that writes appropriate values into the control registers to switch between the single thread mode and the multi-thread mode.

6. The microprocessor of claim 1, wherein the facility is a register renamer that maps logical register references in instructions to registers in the first register file and the second register file.

7. The microprocessor of claim 1, further comprising write lines extending between the first register file and the second register file so that contents of one of the first and second register files may be copied to the other of the first and second register files.

8. The microprocessor of claim 1, wherein the microprocessor supports simultaneous multi-threading.

9. In a microprocessor having a first register file and a second register file, a mapping mechanism for mapping a logical register name to registers in both the first register file and the second register file so that first and second resister file hold identical contents when in a single thread mode and for mapping references to registers in instructions of a first thread solely to registers in the first register file and references to registers in instructions in a second thread to registers in the second register file when in a multi-thread mode.

10. The mapping mechanism of claim 9, wherein the mapping mechanism switches between the single thread mode and the multi-thread mode when directed by a control mechanism.

11. In a microprocessor having multiple register sets, a method, comprising the steps of:

providing respective threads that are simultaneously executing in a multi-thread mode with exclusive access to separate respective ones of the register sets; and switching from the multi-thread mode to a single thread mode where a single thread is executing and where in the single thread mode, a single register name is renamed to refer to a location in each respective ones of the registers sets.

12. The method of claim 11, wherein each of the register sets is a respective register file.

13. The method of claim 11, where two simultaneously executing threads are provided in the multi-thread mode.

14. The method of claim 11, wherein the microprocessor includes control registers and wherein the method further comprises prompting the switching by writing values in the control registers.

15. The method of claim 11, wherein the switching comprises propagating values held in a first of the register sets to a second of the register sets to regain coherence between the first and second register sets.

16. A microprocessor, comprising:

a first bank of execution units for executing instructions;

a second bank of execution units for executing instructions;

a first register file having read and write ports associated with the first bank of execution units and read and write ports associated with the second bank of execution units;

a second register file having read and write ports associated with the first bank of execution units and read and write ports associated with the second bank of execution units; and circuitry for enabling or disabling selected ones of the read ports and the write ports to control access by threads to the register files wherein, in a single thread mode, the circuitry enables the read and write ports for both the first register file and the second register file for access by a single thread and wherein, a single register name is renamed to refer to a first location in the first register file and a first location in the second register file so that the first register file and the second register file hold identical contents.

17. The microprocessor of claim 16, wherein, in a multi-thread mode, the circuitry enables the read and write ports associated with the first bank of execution units for the first register file for access by a first thread and disables the read and write ports associated with the second bank of execution units for the first register file so as to not be accessible by the first thread.

18. The microprocessor of claim 17, wherein, in the multi-thread mode, the circuitry enables the read and write ports associated with the second bank of execution units for the second register file for access by a second thread and disables the read and write ports associated with the first bank of execution units for the first register file so as to not be accessible by the second thread.

19. The microprocessor of claim 16 further comprising a register renamer for renaming logical references to registers in instructions so as to operate in one of a single thread mode or multi-thread mode of operation.

* * * * *